J. E. Voils.
Revolving Rake.
No. 84,028.  Patented Nov. 10, 1868.
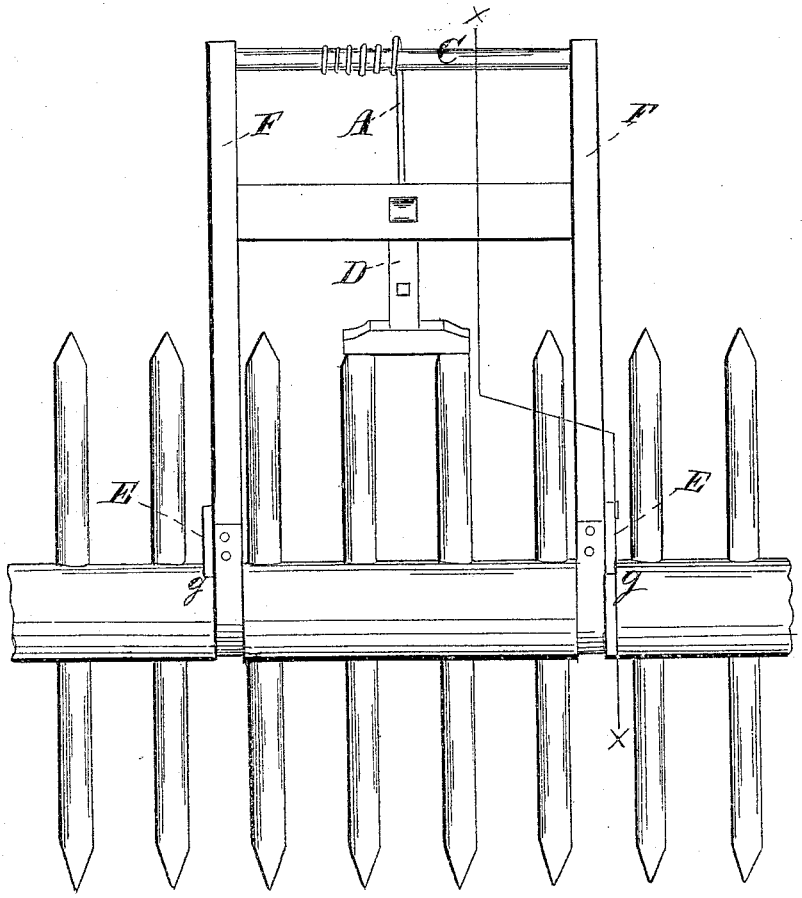
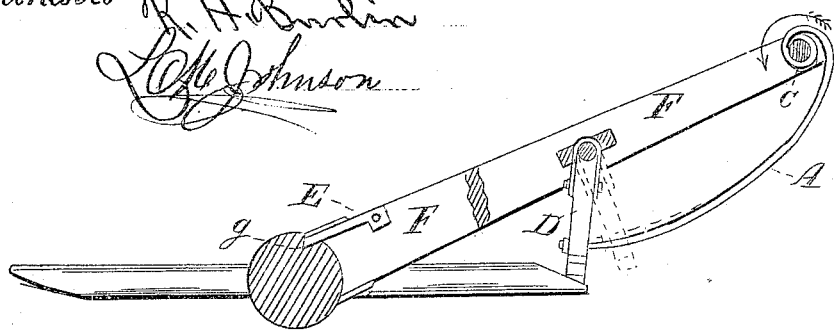
Witnesses
R. H. Burdin
L. M. Johnson
Inventor
J. E. Voils
by A. M. Connett & Bro.
Attys.

United States Patent Office.

J. E. VOILES, OF MADISON, INDIANA, ASSIGNOR TO HIMSELF AND JOHN W. HUTCHINGS, OF THE SAME PLACE.

Letters Patent No. 84,028 dated November 10, 1868.

IMPROVEMENT IN HORSE-RAKES.

The Schedule referred to in these Letters Patent and making part of the same.

*To all whom it may concern:*

Be it known that I, J. E. VOILES, of Madison, in the county of Jefferson, and State of Indiana, have invented new and useful Improvements in Horse-Rakes; and I do hereby declare the following is a full, clear, and exact description thereof, which will enable those skilled in the art to make and use the same, reference being had to the accompanying drawings, forming part of this specification.

Object.

The object of this invention is to furnish an attachment to the revolving horse-rake in common use, whereby the rake can be made to revolve more readily and with less labor than with the devices now in use for that purpose.

Figure 1 is an oblique projection of the front of the rake.

Figure 2 is a cross-section through the line *x x*.

Similar letters of reference indicate corresponding parts.

The operating-mechanism consists of the roller C, turning in journals in the handles F F of the rake. Around this roller is wound a coil-spring, A, one end of which is fastened to the roller, and the other end brought under the handles, and fastened with a nut and screw, or other device, to the vibrating cross-head D. This cross-head rests on the points of the two centre teeth of the rake, and is kept there by the force of the coil-spring A, thus preventing the rake from revolving.

When the operator desires to discharge the accumulated load, he turns the roller C in the direction indicated by the arrow, fig. 2. This motion causes the spring A to be wound on the roller, thus drawing the cross-head D from its position on the rake-teeth, as indicated in red lines, fig. 2, and allows the rake to revolve. When the rake has made one revolution, the pawls E E fall of their own weight into the notches *g g* in the rake-head, thus preventing it from turning backward, while the cross-head D, having resumed its original position on the points of the rake-teeth by the reaction of the spring A, the rake is thus completely locked and ready to move forward.

Having thus described my invention,

What I claim as new, and desire to secure by Letters Patent, is—

A releasing-device for the teeth of revolving horse-rakes, composed of the coil-spring A, roller C, and vibrating cross-head D, when arranged and operated substantially as shown and described.

J. E. VOILES.

Witnesses:
A. M. CONNETT,
J. W. HUTCHINGS.